United States Patent [19]

Adachi

[11] Patent Number: 5,671,300

[45] Date of Patent: Sep. 23, 1997

[54] IMAGE PROCESSING APPARATUS

[75] Inventor: Susumu Adachi, Osaka, Japan

[73] Assignee: Shimadzu Corporation, Kyoto, Japan

[21] Appl. No.: 257,018

[22] Filed: Jun. 8, 1994

[30] Foreign Application Priority Data

Jun. 30, 1993 [JP] Japan .................................. 5-160698

[51] Int. Cl.$^6$ ...................................................... G06K 9/00
[52] U.S. Cl. ................................................ 382/312; 382/100
[58] Field of Search ..................................... 382/312, 319,
382/100; 358/471, 474

[56] References Cited

U.S. PATENT DOCUMENTS

| | | | |
|---|---|---|---|
| 4,496,982 | 1/1985 | Levine | 358/221 |
| 4,590,520 | 5/1986 | Frame et al. | 358/163 |
| 4,858,013 | 8/1989 | Matsuda | 358/213.17 |
| 4,959,736 | 9/1990 | Mino et al. | 358/474 |
| 5,214,518 | 5/1993 | Kato | 358/448 |

FOREIGN PATENT DOCUMENTS

| | | |
|---|---|---|
| 2686471 | 7/1993 | France . |
| 2-215286 | 8/1990 | Japan . |

*Primary Examiner*—Yon J. Couso
*Attorney, Agent, or Firm*—Nikaido, Marmelstein, Murray & Oram LLP

[57] ABSTRACT

An apparatus for processing a two-dimensional image obtained by scanning sensor arrays of image detectors perpendicular thereto, the apparatus including an image memory for storing pixel data output by the image detector as a two-dimensional image, a first read-out unit for reading the stored pixel data about a particular detector in a particular array, a second read-out unit for reading pixel data in the neighborhood of the pixel data read by the first read-out unit, a first arithmetic unit for measuring the magnitude of difference in sensitivity between the detector whose pixel data is read by the first read-out unit and the detector whose pixel data is read by the second read-out unit, and a second arithmetic unit for compensating for the deficiency of sensitivity on the basis of the output of the first arithmetic unit.

3 Claims, 1 Drawing Sheet

IMAGE PROCESSING APPARATUS

BACKGROUND OF THE INVENTION

The present invention relates to an image processing apparatus used in association with image detecting apparatus, such as X-ray image detecting apparatus, for medical and industrial use.

Latest type of X-ray image detecting apparatus are provided with one-dimensional sensor arrays each of which includes a plurality of image detectors of semiconductor. The sensor arrays are scanned perpendicular thereto so as to obtain a two-dimensional image. In addition, a Memory is provided for storing the two-dimensional image by arranging pixel data output by the image detectors in a predetermined pattern.

This type of image detecting apparatus has a problem in that if any sensor array includes a defective image detector having a reduced sensitivity, the image produced by the defective detector is spoiled by a line noise.

If the defective image detector amounts to be more than one, or alternatively, if the extent of unequal sensitivity depends upon temperature, it is difficult to adjust all the image detectors so as to have equal sensitivity.

SUMMARY OF THE INVENTION

The present invention is to provide an image processing apparatus usable in association with image detecting apparatus in order to remove a line noise likely to occur because of unequal sensitivity between image detectors which constitute sensor arrays.

According to the present invention, the image processing apparatus includes an image memory for storing pixel data output by the image detector as a two-dimensional image, a first read-out means for reading the stored pixel data about a particular detector in a particular array, a second read-out means for reading pixel data in the neighborhood of the pixel data read by the first read-out means, a first arithmetic means for measuring the magnitude of difference in sensitivity between the detector whose pixel data is read by the first read-out means and the detector whose pixel date is read by the second read-out means, and a second arithmetic means for compensating for the deficiency of sensitivity on the basis of the output of the first arithmetic means.

Pixel data output by the image detectors is linearly arranged and stored in the memory, and the first read-out means reads the pixel data wholly or partially from the memory. Then the second read-out memory reads another pixel data in the neighborhood of the first-mentioned pixel data read by the first read-out means. The first arithmetic means measures the magnitude of a difference in the sensitivity between a particular image detector and the other image detectors.

If all the image detectors have a uniform sensitivity, and the resulting image is sufficiently even with no dark or bright spots, the mean value per pixel obtained from all the pixel data output by the particular image detector must be in agreement with that obtained from all the pixel data output by the other image detectors in the neighborhood of the particular image detector. This means that the difference in sensitivity is 0 (zero). If there is a difference between both the mean values, the difference indicates that there is a difference in sensitivity. By using this difference, the second arithmetic means compensates for the deficient pixel data output by the particular detector on the basis of the output by the first arithmetic means. In this way, according to the present invention, a line noise can be removed with the original resolution of image maintained.

DETAILED DESCRIPTION OF THE PREFERRED EMBODIMENT

Figure 1:
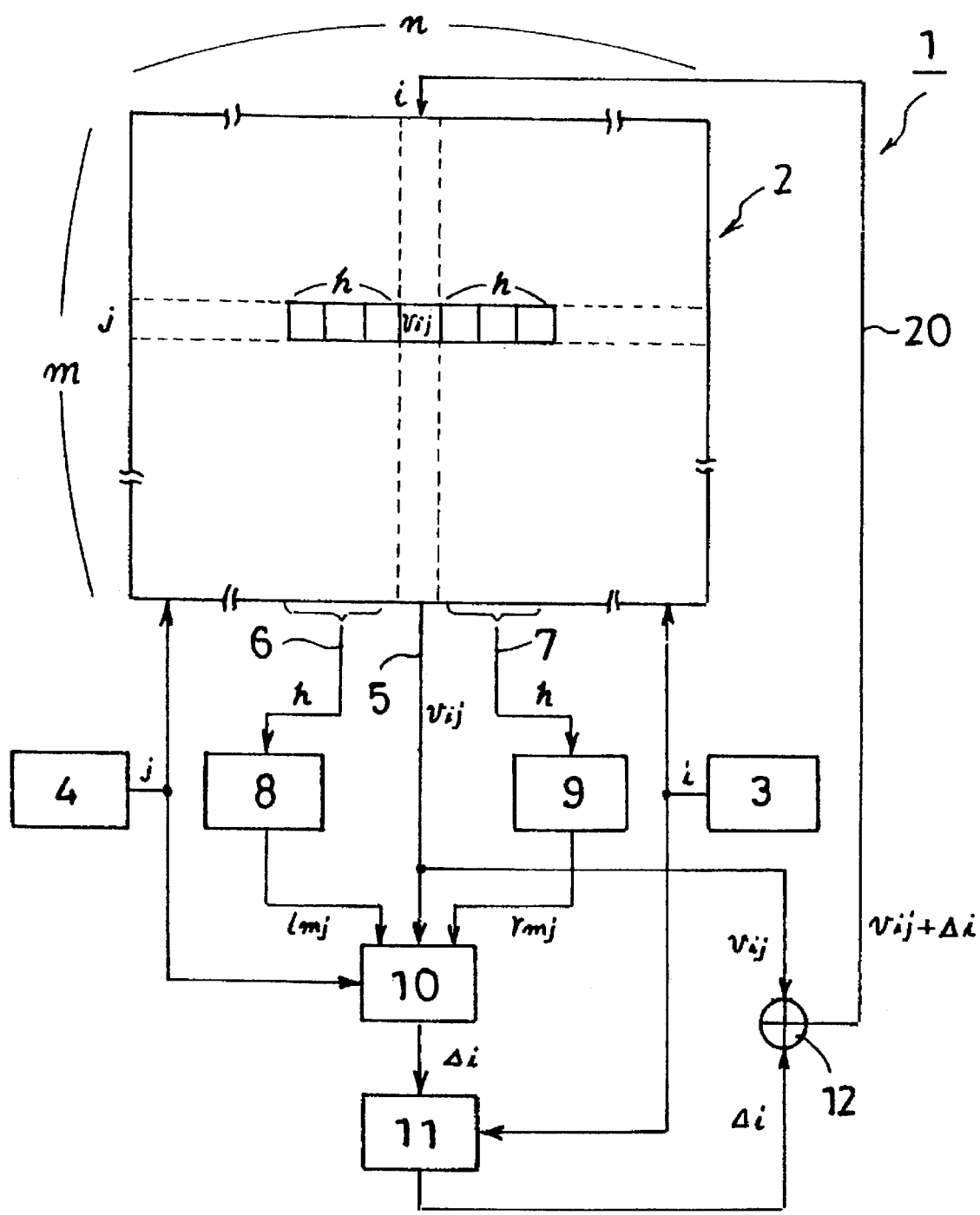
FIG. 1 is a block diagram diagrammatically showing the entire structure of the image processing apparatus embodying the present invention.

The exemplary apparatus 1 is provided with m rows of sensor arrays each array having n pieces of image detectors, which will hereinafter be referred to merely as "detector". The sensor arrays are scanned perpendicular thereto so as to obtain a two-dimensional image which consists of (n×m) pieces of pixels. Now, suppose that the (i)th detector i outputs pixel data $V_{ij}$ (j=1 to m), a mean value per pixel obtained will be:

$$S_i = \sum_{j=1}^{m} V_{ij}/m$$

If all the detectors have equal sensitivity and the resulting image is safe from any noise, the value $S_i$ ought to be equal to the mean value $S'_i$ obtained about a pixel situated near to the detector i.

If the detector i has a low sensitivity, the mean values will be as follows:

$$S_i < S'_i$$

This unequal relationship will be visually observed as a dark line (alternatively, an excessively bright line) formed by the outputs from the detector i. In order to remove this line noise, the difference $\Delta$ between $S_i$ and $S'_i$ should be added to the data $V_{ij}$ (j=1 to m). The exemplary apparatus 1 shown in FIG. 1 is based on this principle.

The exemplary apparatus 1 includes two memories 2 and 11, a first counter 3 and a second counter 4, data buses 5, 6, 7, and 20, a first arithmetic unit 8, a second arithmetic unit 9, and a third arithmetic unit 10.

The memory 2 stores an image which consists of (n×m) pieces of pixels obtained by scanning sensor arrays (not shown) each having n pieces of detectors. The first counter 3 indicates the position of pixel along the array to which it belongs, and the second counter 4 indicates the position of pixels in the scanning direction of the arrays.

The data buses 5, 6, and 7 are led from the memory 2. The data bus 5 outputs data $V_{ij}$ from the counters 3 and 4, and the data buses 6 and 7 output data about pixel h, that is, $(V_{(i-h)j} \sim V_{(i-1)j})$ and $(V_{(i+1)j} \sim V_{(i+h)j})$. The data bus 20 is also connected to the memory 2 so as to change the pixel data $V_{ij}$ about the positions of pixels indicated by the counters 3 and 4 therethrough.

The arithmetic units 8 and 9 receive inputs delivered thereto through the data buses 6 and 7, respectively. The third arithmetic unit 10 receives outputs from the arithmetic units 8 and 9, and the pixel data $V_{ij}$ through the data bus 5.

The arithmetic units 8 and 9 calculate a median (alternatively, a mean value) of data about the pixel h input thereto, and generate outputs $l_{mj}$ and $r_{mj}$, respectively.

The third arithmetic unit 10 houses four resistors l, r, c, and k (neither shown), and if the value $|l_{mj} - r_{mj}|$ smaller than a predetermined value $\epsilon$, the resistor l increases its value by $l_{mj}$. Likewise, the resistor r increases its value by $r_{mj}$, the resistor c increases its value by $V_{ij}$, and the resistor k increases its value by 1. These increments are made for j (=1 to m). When j becomes equal to m, the third arithmetic unit 10 calculate the value $\Delta_i=[(l+r)/2-c]/k$. The resulting value $\Delta_i$ is stored in the (i)th of the memory 11 as a compensating value. When j becomes equal to 1, each resistor in the third arithmetic unit 10 is reset to 0 (zero), and thereafter, the increment is performed.

In the above-mentioned process, the data 1 $||r_{mj}-r_{mj}|>\epsilon$ is ignored. A large difference in sensitivity between adjacent points indicates that an image obtained is about an out-of-focus condition of the edge portion of the object. From this, the out-of-focus can be realized and remedied. The value $\epsilon$, which is a parameter obtainable through experiments, is determined according to the magnitude to which a line noise due to different sensitivities between the detectors is removed.

When the compensating value $\Delta_i$ for each detector is calculated, the counters 3 and 4 are reset to their initial values, and the value $(V_{ij}+\Delta_i)$ is calculated by the calculator 12 while the value j of the second counter 4 is increased for the value i of each first counter 3. The resulting value is put into a predetermined place in the memory 2 through the data bus 20.

If a detector i in a particular array has a different sensitivity from that of the others, the magnitude of the difference can be expressed as a difference $\Delta_i$ between the mean value of all the pixel data output by the faulty detector i and the mean value of all the pixel data output by a detector in the neighborhood of the faulty detector i. By adding this difference $\Delta_i$ to the pixel data $V_{ij}$, that is, $V_{ij}+\Delta_i$, the deficient sensitivity can be easily compensated.

In the illustrated embodiment the compensating value for the detector i is obtained on the basis of $[(l+r)/2-c]/k$ and each pixel is compensated by adding the difference $\Delta_i$ to the faulty value $V_{ij}$ (j=1 to m). The compensation is not limited to this method but it is also possible to use the following formula as a compensating value:

where $\Delta i=(l+r)/(2c)$.

What is claimed is:

1. An apparatus for processing a two-dimensional image obtained by scanning sensor arrays of image detectors perpendicular thereto, the apparatus comprising:

an image memory for storing pixel data output by the image detector as a two-dimensional image;

a first read-out means for reading the stored pixel data about a particular detector in a particular array;

a second read-out means for reading pixel data in the neighborhood of the pixel data read by the first read-out means;

a comparing arithmetic means for measuring the magnitude of difference in sensitivity between the detector whose pixel data is read by the first read-out means and the detector whose pixel data is read by the second read-out means; and a calculating arithmetic means for compensating for the deficiency of sensitivity on a basis of the output of the comparing arithmetic means, wherein the second read-out means comprises a pair of data buses through which data about adjacent pixels located on each side of the pixel whose data is read by the first read-out means, and wherein the apparatus further comprises a first median arithmetic means and a second median arithmetic means coupled to said image memory and said comparing arithmetic means, said first and second median arithmetic means for calculating a median or a mean value of data about the pixels read by the data buses, and for generating outputs corresponding to the calculated median or mean value to the comparing arithmetic means.

2. An apparatus for processing a two-dimensional image obtained by scanning sensor arrays of image detectors perpendicular thereto, the apparatus comprising:

an image memory for storing pixel data output by the image detector as a two-dimensional image:

a first read-out means for reading the stored pixel data about a particular detector in a particular array;

a second read-out means for reading pixel data in the neighborhood of the pixel data read by the first read-out means;

a comparing arithmetic means for measuring the magnitude of difference in sensitivity between the detector whose pixel data is read by the first read-out means and the detector whose pixel data is read by the second read-out means;

a calculating arithmetic means for compensating for the deficiency of sensitivity on a basis of the output of the comparing arithmetic means; and a first counter and a second counter both connected to the image memory, wherein the first counter indicates the position of the pixels along the array to which they belong and the second counter indicates the position of the pixels in a direction in which the arrays are scanned, wherein the second read-out means comprises a pair of data buses through which data about adjacent pixels located on each side of the pixel whose data is read by the first read-out means, and wherein the apparatus further comprises a first median arithmetic means and a second median arithmetic means coupled to said image memory and said comparing arithmetic means, said first and second median arithmetic means for calculating a median or a mean value of data about the pixels read by the data buses, and for generating outputs corresponding to the calculated median or mean value to the comparing arithmetic means.

3. The apparatus according to claim 2, wherein the comparing arithmetic means comprises a first resistor, a second resistor, a third resistor, and a fourth resistor arranged in such a manner that if the absolute value of a difference between the medians or mean values is below a reference value, the first resistor is caused to increase its value by the median or mean value output by the first median arithmetic means, the second resistor is caused to increase its value by the median or mean value output by the second median arithmetic means, the third resistor is caused to increase its value by the pixel data read by the first read-out means, and the fourth resistor is caused to increase its value by 1 (one).

* * * * *